US012715028B2

(12) United States Patent
Kim

(10) Patent No.: US 12,715,028 B2
(45) Date of Patent: Aug. 25, 2026

(54) BATTERY DISPOSAL APPARATUS AND BATTERY DISPOSAL METHOD USING SAME

(71) Applicant: SK On Co., Ltd., Seoul (KR)

(72) Inventor: Hae Joong Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 621 days.

(21) Appl. No.: 18/195,037

(22) Filed: May 9, 2023

(65) Prior Publication Data

US 2024/0033791 A1 Feb. 1, 2024

(30) Foreign Application Priority Data

Jul. 26, 2022 (KR) ........................ 10-2022-0092625

(51) Int. Cl.

| | |
|---|---|
| ***H01M 10/54*** | (2006.01) |
| ***B09B 3/35*** | (2022.01) |
| ***B09B 3/70*** | (2022.01) |
| *B09B 101/16* | (2022.01) |

(52) U.S. Cl.

CPC .................. *B09B 3/70* (2022.01); *B09B 3/35* (2022.01); *B09B 2101/16* (2022.01)

(58) Field of Classification Search

None

See application file for complete search history.

(56) References Cited

U.S. PATENT DOCUMENTS

2005/0181713 A1* 8/2005 Sekiya .................... B24C 1/045 451/87
2010/0146761 A1* 6/2010 Sloop .................... H01M 10/54 29/403.3
2018/0013181 A1* 1/2018 Ho .......................... H01M 6/52
2020/0328482 A1 10/2020 Ho et al.
2024/0021901 A1* 1/2024 Uchida ................... B24C 1/045

FOREIGN PATENT DOCUMENTS

CN 108110363 * 6/2018 ............ H01M 10/54
CN 208977614 * 6/2019 ............... B24C 1/04
JP 4358489 B2 11/2009
KR 100860972 B1 9/2008
KR 1020110046938 A 5/2011
KR 101075446 B1 10/2011
KR 101827824 B1 * 2/2018 ............... B26D 7/22
KR 102059050 B1 12/2019

OTHER PUBLICATIONS

English translation of CN 208977614 (Year: 2019).*
English translation of KR 101827824 (Year: 2018).*
English translation of CN 108110363 (Year: 2019).*

* cited by examiner

*Primary Examiner* — Yoshitoshi Takeuchi
(74) *Attorney, Agent, or Firm* — The Webb Law Firm

(57) ABSTRACT

Disclosed is a battery disposal apparatus including a cutting part configured to cut and divide a battery, and a discharging part configured to immerse and discharge divided pieces of the battery cut and divided in the cutting part in a discharging solution. The cutting part is configured to incise or cut the battery in a preset pattern by water jet. In addition, disclosed is a battery disposal method in which the battery is cut by using the water jet described above and is discharged.

10 Claims, 11 Drawing Sheets

22
222
223
222
221
30
31
32
X
Y
21
21a
12
W
20
12
1
11
10

1
10
11
12
20
21
21a
221
W
30
31
32
40
41
42
X
Y

BATTERY DISPOSAL APPARATUS AND BATTERY DISPOSAL METHOD USING SAME

CROSS REFERENCE TO RELATED APPLICATION

This application claims priority to Korean Patent Application No. 10-2022-0092625, filed Jul. 26, 2022, the disclosure of which is hereby incorporated by reference in its entirety.

BACKGROUND OF THE INVENTION

Field of the Invention

The present disclosure relates to a battery disposal apparatus and a battery disposal method.

Description of Related Art

Generally, a secondary battery is a battery capable of being repeatedly charged and discharged, and is applied as a power source for an electric vehicle (EV), a hybrid vehicle (HEV), and an energy storage system (ESS).

Such a secondary battery may be classified into a cylindrical battery, a prismatic battery, and a pouch-type battery according to the external shape of a casing that receives an electrode assembly. Recently, a demand for a thin pouch-type secondary battery is increasing.

As the usage of a secondary battery is rapidly increasing, the amount of disposal of secondary battery is also increasing. A waste secondary battery that has reached the end of life thereof is required to be disposed of so that high value-added raw materials are recovered from the battery without environmental pollution to be recycled. When the remaining electric energy of the waste secondary battery is indiscriminately disposed of without being completely discharged, there is a risk of ignition or explosion due to electric energy remaining inside the waste secondary battery.

Accordingly, in order to recycle a waste secondary battery, a discharge process of the secondary battery is required. As such a discharge process, a landfill method of discharging the waste secondary battery while the waste secondary battery is buried in a landfill, an immersion method of discharging a waste battery by immersing the waste battery in a discharging solution, which is disclosed in Patent Document 1, and a drilling method of discharging a waste battery by drilling a hole therein, which is disclosed in Patent Document 2, are applied.

As is known to those skilled in the art, the above-mentioned landfill method not only may have the risk of explosion of a battery while the battery is buried in the ground, but also may cause environmental problems by contaminating the soil, and thus the burying of waste batteries in a landfill is avoided. The immersion method is very low in workability since a waste battery is required to be left immersed in a discharging solution for a long time. Furthermore, the drilling method is inappropriate due to the high risk of fire due to internal short circuit caused by contact of a waste battery with a cutter or punching machine in the process of drilling the waste battery.

Accordingly, a waste treatment technology that can safely and efficiently discharge the internal remaining electric energy of a waste secondary battery is required.

DOCUMENTS OF RELATED ART (Patent Document 1) Korean Patent No. 10-0860972 B1
(Patent Document 2) Korean Patent Application Publication No. 10-2011-0046938 A

SUMMARY OF THE INVENTION

Accordingly, the present disclosure has been made keeping in mind the above problems occurring in the related art, and the present disclosure is intended to propose an apparatus which can safely dispose of a battery, preferably, a waste battery.

In addition, the present disclosure includes a battery disposal method using the above-described battery disposal apparatus.

In order to achieve the above objective, according to one aspect of the present disclosure, there is provided a battery disposal apparatus including: a cutting part configured to cut and divide a battery; and a discharging part configured to immerse and discharge divided pieces of the battery cut and divided in the cutting part in a discharging solution, wherein the cutting part is configured to incise or cut the battery in a preset pattern by water jet.

Preferably, the cutting part may include: a transfer conveyor which has a drainage hole formed in an inner portion of a belt of the transfer conveyor supporting the battery and transfers the battery; and a water jet unit located above the transfer conveyor configured to spray a water jet.

In the present disclosure, the water jet unit may reciprocate a water jet nozzle, which sprays the water jet at high pressure on a two-axis (X and Y axes) plane.

In the present disclosure, the battery disposal apparatus may further include an aligning part disposed at an upstream side of the cutting part, wherein the aligning part may include: an introducing conveyor configured to seat and align the battery and transfer the battery to a downstream side; and at least two guide bars disposed to be spaced apart from each other by facing each other along a moving direction of the introducing conveyor.

In the present disclosure, a separating part may be placed between the cutting part and the discharging part, wherein the separating part may include: a removing conveyor which transfers the divided pieces of the battery to the discharging part; and a blade which extends in a moving direction of the removing conveyor.

Preferably, the blade may be made of an insulating material and may be disposed on the removing conveyor so that the blade corresponds to a cut portion of the battery.

Selectably, a front end part of the blade may be formed in a wedge shape having thickness gradually increasing toward a rear end part of the blade.

Furthermore, in the present disclosure, the discharging solution may include water (H2O).

A battery disposal method according to the present disclosure includes the steps of: aligning the battery by seating the battery to transfer the battery to the downstream side; dividing the battery by incising or cutting the battery in a preset pattern by means of a water jet; and discharging divided pieces of the battery by immersing the divided pieces in a discharging solution.

The battery disposal method may further include the step of: separating the divided pieces of the battery in which the divided pieces are guided to the discharging by stopping direct contact of the divided pieces with each other after the dividing of the battery.

In the dividing of the battery, to cut and divide the battery in a preset pattern, the water jet nozzle which sprays the water jet at high pressure may be configured to reciprocate on a two-axis (X and Y axes) plane.

Furthermore, in the present disclosure, the discharging solution may include water.

Features and advantages of the present disclosure will become more apparent with the following detailed description based on the accompanying drawings.

Prior to this, the terms or words used in the present specification and claims should not be construed in a conventional and dictionary meaning and should be interpreted as a meaning and concept consistent with the technical idea of the present disclosure, based on the principle that the inventor can appropriately define the concepts of terms in order to explain the present disclosure in the best way.

According to the above description of the present disclosure, after batteries (including underperforming/defective batteries, degraded batteries, and unusable batteries, etc.) are cut and divided by means of water jet, the batteries are discharged and can be safely disposed of.

Furthermore, according to the present disclosure, water jet is used when incising or cutting a battery, it is possible to safely dismantle the battery by preventing deterioration of a cut portion of the battery to prevent fire and explosion, and also to finely process the cut portion in various patterns.

In addition, according to the present disclsoOre, the discharging solution is rapidly infiltrated into an incised portion of a battery, thereby improving a discharge rate.

BRIEF DESCRIPTION OF THE DRAWINGS

The above and other objectives, features, and other advantages of the present disclosure will be more clearly understood from the following detailed description when taken in conjunction with the accompanying drawings, in which.

DESCRIPTION OF THE INVENTION

Figure 1:
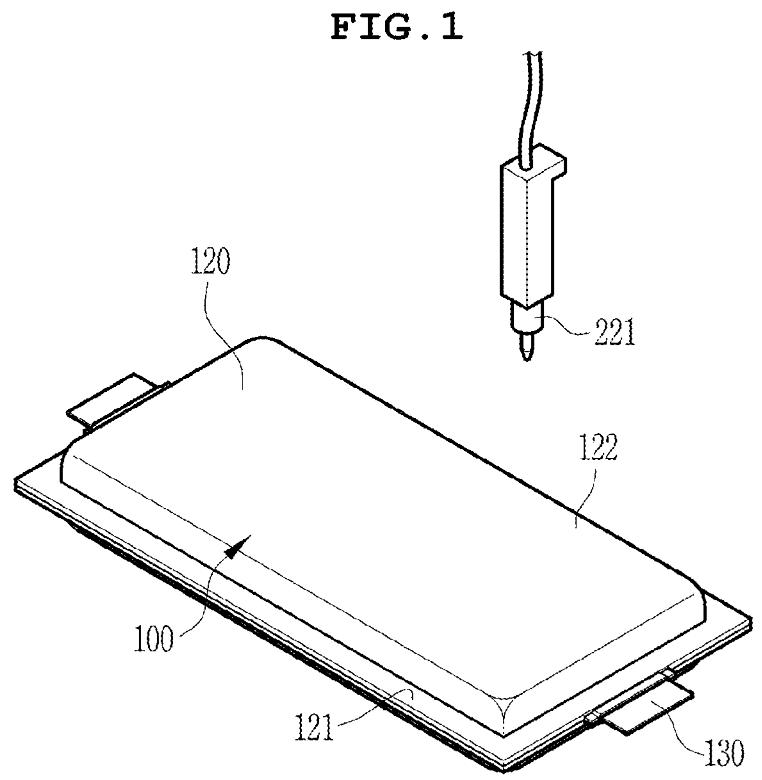
FIG. 1 is a view schematically illustrating the configuration of a battery disposal apparatus according to the present disclosure.

The purpose, advantages, and features of the present disclosure will become more apparent from the following detailed description and exemplary embodiments taken in conjunction with the accompanying drawings, but the present disclosure is not necessarily limited thereto. In addition, in explaining the present disclosure, when it is determined that a detailed description of a related known technology may unnecessarily obscure the gist of the present disclosure, a detailed description thereof will be omitted.

The embodiments described in this document and the accompanying drawings are not intended to limit the present disclosure to the specific embodiments. The present disclosure should be understood to cover various modifications, equivalents, and/or alternatives of the embodiments.

In assigning reference numerals to the components of the drawings, it should be noted that the same components are given the same reference numerals as much as possible even though the components are shown in different drawings, and similar reference numerals are given to similar components.

In this document, terms such as first and second are used to distinguish one component from another component, and components are not limited by these terms. In the accompanying drawings, some components are exaggerated, omitted, or schematically illustrated, and the size of each component does not entirely reflect an actual size thereof.

Hereinafter, an embodiment of the present disclosure will be described in detail with reference to the accompanying drawings.

A battery disposal apparatus of the present disclosure safely disposes of a battery, that is, a waste battery. Particularly, the battery disposal apparatus of the present disclosure is configured to safely dismantle a waste battery by means of water jet. Here, the waste battery may be a secondary battery which cannot be used due to the decrease of storage capacity of electric energy through repeated charging and discharging or due to abnormal use such as overcharging or overdischarging.

Furthermore, according to the present disclosure, a waste battery which is cut and divided is immersed into a discharging solution of a water tank so that the battery can be completely discharged.

Figure 2A:
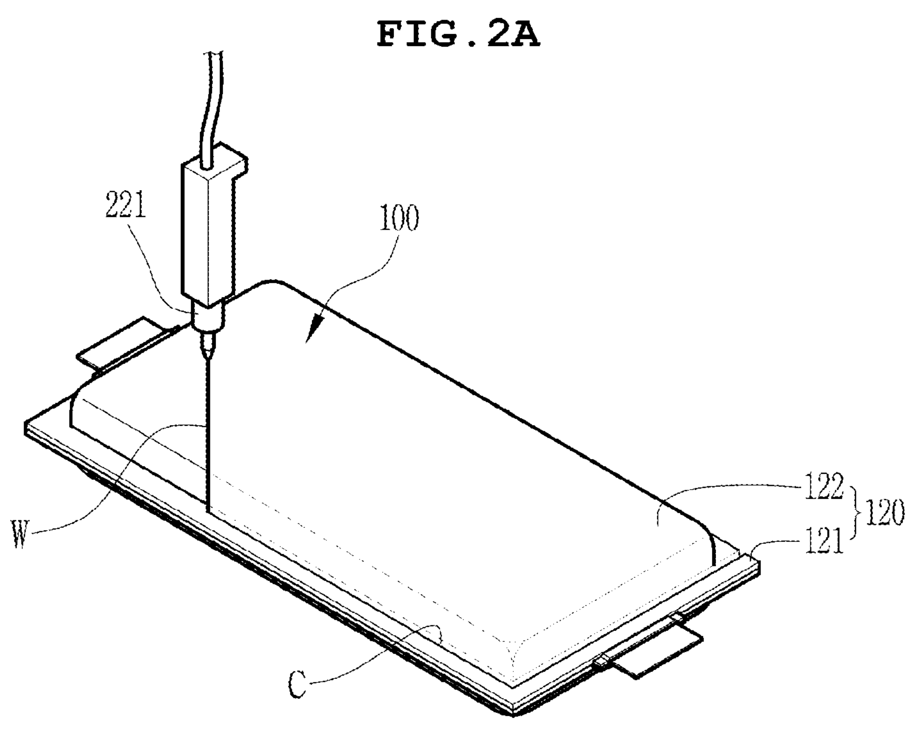
FIG. 2A is a view illustrating a battery cut by the battery disposal apparatus according to the present disclosure.
Figure 2B:
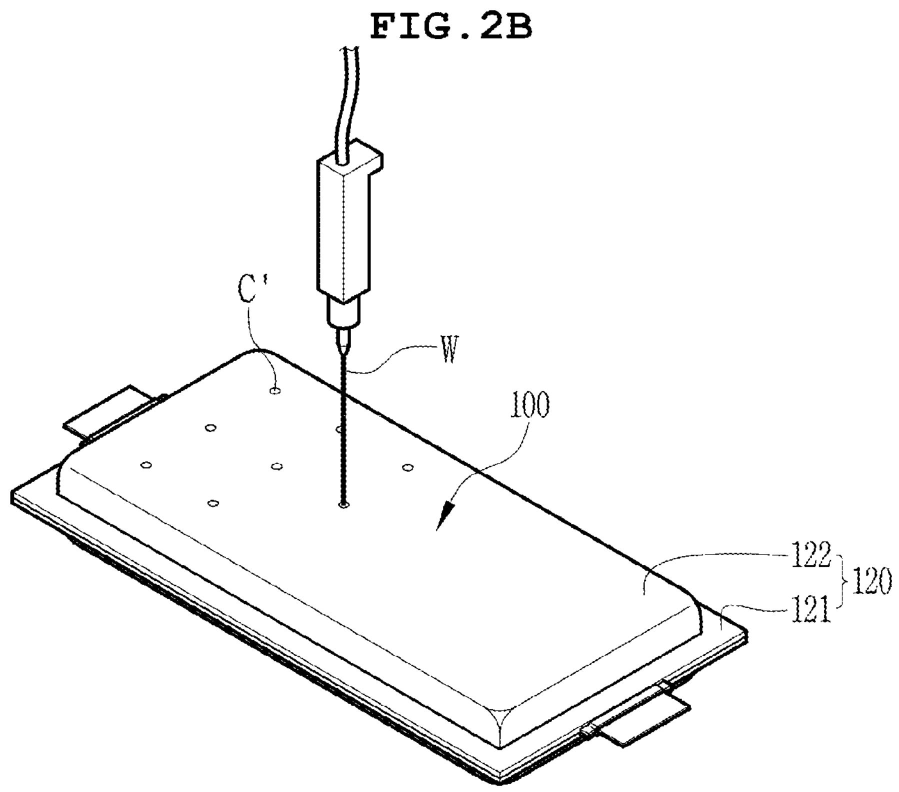
FIG. 2B is a view illustrating a battery cut by the battery disposal apparatus according to the present disclosure.
Figures 2C, 2D:
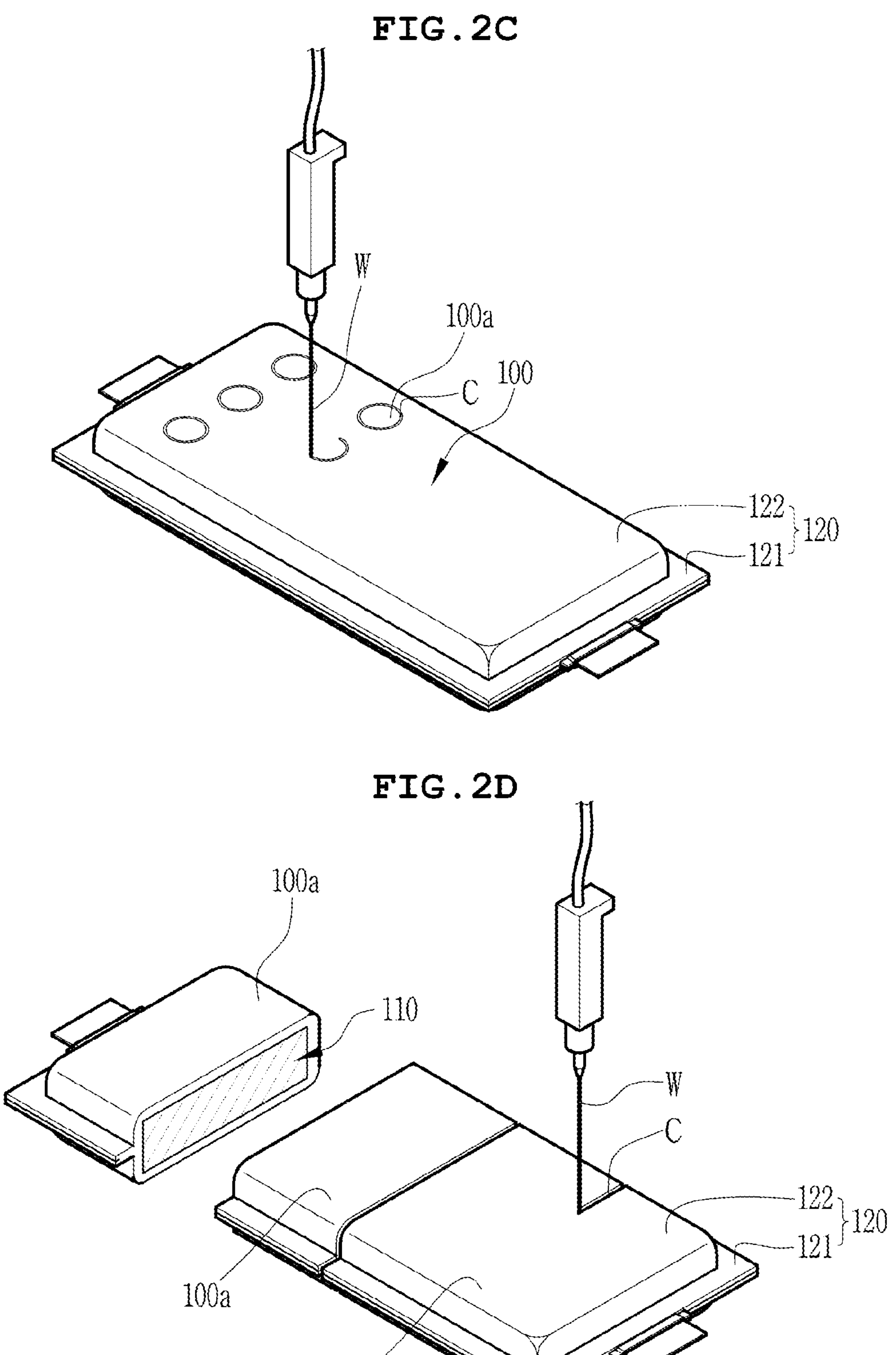
FIG. 2C is a view illustrating a battery cut by the battery disposal apparatus according to the present disclosure.
FIG. 2D is a view illustrating a battery cut by the battery disposal apparatus according to the present disclosure.

As illustrated in FIGS. 1 to 2D, the secondary battery 100 includes the electrode assembly 110 (shown in 2D) to which an electrode lead 130 is coupled, and a pouch 120 which receives the electrode assembly. The electrode assembly 110 is a power generating device which has a structure in which a positive electrode plate, a negative electrode plate, and a separation membrane are sequentially stacked and is capable of being charged and discharged. The pouch 120 may include a sealing part 121 formed in such a manner that an edge of an upper pouch covering the upper side of the electrode assembly and an edge of a lower pouch covering the lower side of the electrode assembly face each other and are sealed to each other by heat fusion to define internal space, and a receiving part 122 which provides internal space between the upper pouch and the lower pouch disposed by being spaced apart from each other inside the sealing part so that the internal space receives an electrolyte together with the electrode assembly. As illustrated in FIG. 1, in the pouch 120, in order to receive the electrode assembly, each of the internal portion of the upper pouch and the internal portion of the lower pouch may have a concave portion, and alternatively, only one of the upper pouch and the lower pouch may have a concave portion.

In the present disclosure, as described above, the battery 100, for example, the secondary battery, is incised or cut by a water jet sprayed at high pressure by a water jet nozzle 221 and is discharged in water so that the battery can be disposed of. Here, the battery is a battery to be discarded, and may be, for example, a battery with poor performance/defects, a battery with degraded performance, an unusable battery, or a usable battery. In this specification, it should be noted in advance that batteries and waste batteries may be used by mixing same with each other.

A water jet does not deteriorate a cut portion and thus can prevent fire in advance during the incising or cutting process of a battery, and can incise or cut a battery in precise and various patterns. In addition, due to excellent cutting ability of the water jet, the water jet can provide a clean cut surface to a battery. Furthermore, remaining electric energy in a battery that has been cut and divided is completely discharged through a discharging process to be described later.

As illustrated in FIG. 2A, in the battery 100, a cut line C is formed along the connection portion between the sealing part 121 and receiving part 122 of the pouch 120 by a high-pressure water jet so that the sealing part and the receiving part can be cut and divided. Accordingly, the upper pouch and the lower pouch constituting the receiving part are separated from each other, and gas and/or electrolyte stored in the internal space of the pouch may be ejected to the outside.

As is known to those skilled in the art, a secondary battery may have internal pressure increased by internal gas generated by overcharging, overdischarging, overheating, and external impact, etc. An increase in the internal pressure of the secondary battery may result in an explosion of the secondary battery. The water jet is sprayed to a connection portion between the sealing part 121 and the receiving part 122 described above by the water jet nozzle 221 to first perforate a small-sized cut groove and may enlarge a cutting range while moving along the connection portion relative to the cut groove. According to the present disclosure, by first perforating a small-sized cut groove by means of the water jet, internal gas charged in the sealed internal space of the battery is ejected to the outside to gradually reduce internal pressure of the space, so it is possible to minimize the influence of the ejection of the internal gas. When internal pressure in the pouch of the battery is lowered, the cutting range is enlarged by the water jet, and thus a large amount of electrolyte may be rapidly discharged to a gap between the upper pouch and the lower pouch and later, whereby the electrode assembly may be easily removed/separated.

According to the present disclosure, at least one cut groove C' may be drilled in the battery 100 by the water jet W (see FIG. 2B). According to the present disclosure, at least one cut groove is preferably drilled in the receiving part 122 of the battery to ensure the discharge of internal gas and an electrolyte and to allow the efficient flow of the discharging solution into the battery through the at least one cut groove.

Alternatively, according to the present disclosure, the battery 100 may be divided into multiple divided pieces 100*a* in various patterns by water jet. For example, one or more circular divided pieces (see FIG. 2C) may be removed along circular cut lines C in the receiving part 122 of the battery by using water jet, or cut lines C may be formed on the battery in a longitudinal direction and/or a transverse direction by using the water jet so that the battery can be cut and divided into multiple divided pieces 100*a* (see FIG. 2D).

Preferably, in the battery disposal apparatus of the present disclosure, the water jet nozzle 221, which generates the water jet W, is induced to perform a two-axis (X and Y axes) movement above the battery so that the battery can be cut and divided into battery pieces of various sizes and shapes. For example, in the battery disposal apparatus of the present disclosure, while the water jet nozzle 221 is moved in an X-axis direction, a Y-axis direction, or a combined direction thereof by means of a water jet unit to be described later, the water jet nozzle 221 may spray the water jet toward the battery to be processed.

According to a conventional technology, in the process of dismantling a waste battery by a cutter or punching machine, there is always a risk of fire due to damage to an internal electrode and an internal short-circuit caused by contact between a cut member and the electrode assembly, and there is an inherent risk of exposure of a worker to toxic substances due to the scattering of electrolytes. Unlike this, according to the present disclosure, a water jet sprayed at high pressure may perform incising or cutting process without deteriorating the cut portion of the battery, and may forcibly induce the flow direction of the electrolytes in the spraying direction of the water jet so that the risk of exposure to toxic substances can be reduced and the recovery rate of the electrolytes can be increased.

Figure 3:
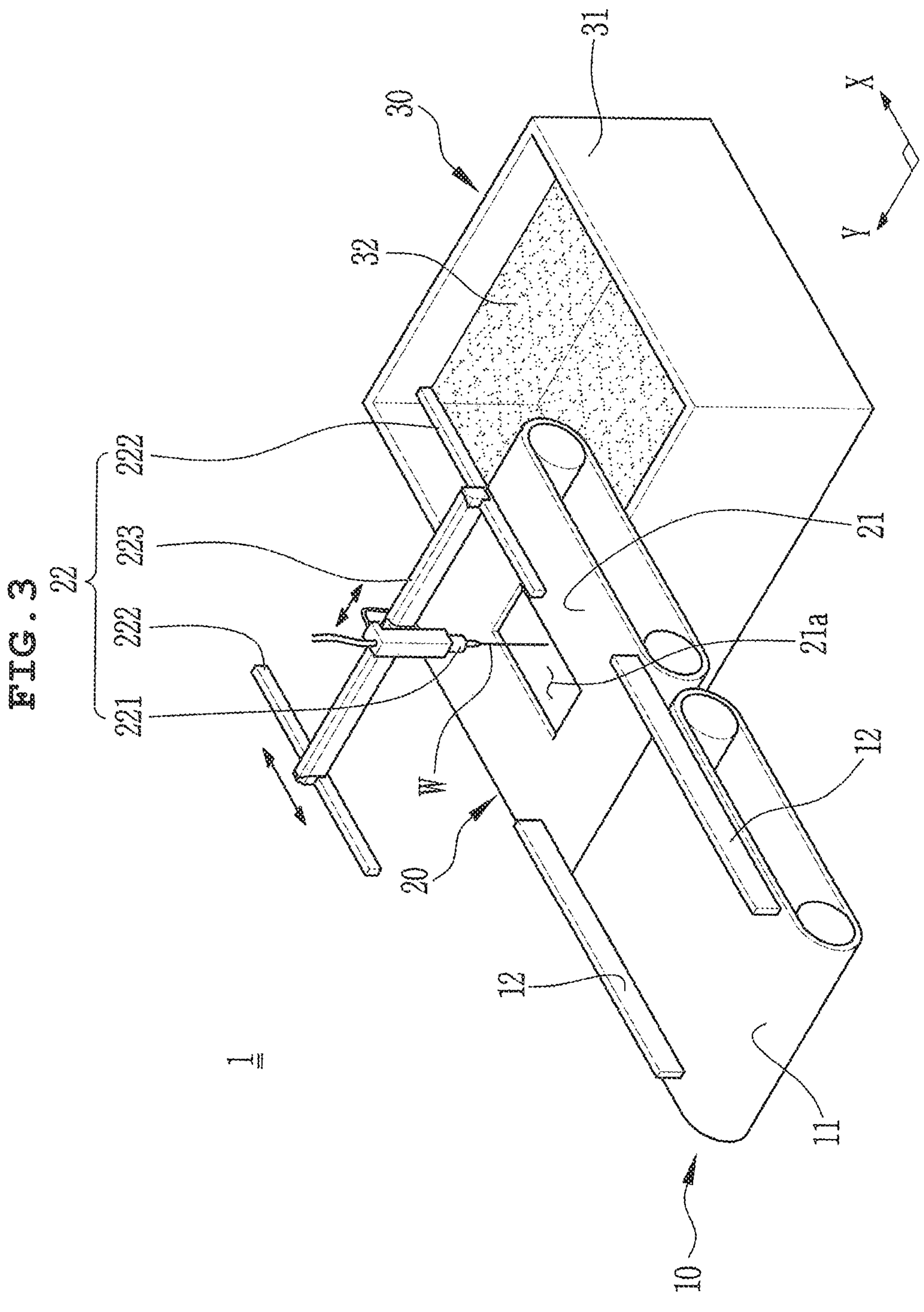
FIG. 3 is a perspective view schematically illustrating the battery disposal apparatus according to one embodiment of the present disclosure.

The present disclosure may propose the embodiment of the battery disposal apparatus illustrated in FIG. 3 so as to safely dispose of the battery. That is, in order to discharge a pouch-type battery after applying a physical treatment such as cutting to the pouch-type battery, the battery disposal apparatus of the present disclosure includes a cutting part 20 which incises or cuts the battery, and a discharging part 30 which rapidly discharges the battery cut and divided, and accordingly, fast penetration of the discharging solution into the battery is ensured and electrolytes charged inside the battery can be easily recovered.

Specifically, according to the embodiment of the present disclosure, the battery disposal apparatus 1 that can dispose of a battery at once in a continuous process may include an aligning part 10 and the cutting part 20 for cutting and dividing the battery into preset shapes and sizes, and the discharging part 30.

The aligning part 10 is disposed at the upstream side of the cutting part 20 to seat and align the battery, and includes an introducing conveyor 11 which transfers the battery to the cutting part 20 which is a process subsequent to the aligning part 10, and at least two guide bars 12 disposed on the belt of the introducing conveyor 11 to be spaced apart from each other by facing each other. According to the present disclosure, as illustrated in FIG. 3, one pair of guide bars 12 may be disposed side by side on the introducing conveyor. While the battery is placed between the at least two guide bars 12 and is transferred in the moving direction (the X-axis direction) of the introducing conveyor, the battery can maintain a constant aligned state without deviating from the aligning part.

As illustrated in the drawing, the at least two guide bars 12 are disposed parallel to each other by maintaining a predetermined interval therebetween in the width direction (the Y-axis direction) of the belt of the introducing conveyor), and each of the guide bars may be preferably disposed to be spaced apart from each other by having a size corresponding to the length of the battery. Here, the width direction means a direction orthogonal to the moving direction of the battery. Furthermore, the at least two guide bars 12 are positionally fixed on the belt of the introducing conveyor 11 so as not to rotate in conjunction with the introducing conveyor 11, and extend to the front of a transfer conveyor 21 of the cutting part, so the two guide bars 12 may guide the introduction of the battery to a component behind the two guide bars 12, that is, the cutting part 20 while the battery is aligned. When required, the at least two guide bars 12 may be respectively located parallel with the opposite edges of the introducing conveyor 11 without being disposed on the belt of the introducing conveyor.

The cutting part 20 is disposed at the downstream side of the aligning part 10, and is a component which can incise or cut a battery in various present patterns by the water jet W as illustrated in FIGS. 2A to 2D. The cutting part includes: the transfer conveyor 21 which supports a battery introduced from the aligning part 10 and transfers the battery to the discharging part 30, and the water jet unit 22 disposed above the belt of the transfer conveyor 21.

The water jet unit 22 is configured to generate a water jet which incises or cuts a battery placed on the belt of the transfer conveyor, and the position of the water jet nozzle 221 which sprays the water jet at high pressure above the battery is changed so that the battery can be incised or cut in various preset patterns. For example, the water jet unit 22 includes a pair of guide rails 222 extending from the upper sides of the opposite ends of the transfer conveyor 21 in the moving direction (the X-axis direction), a slider 223 disposed between the pair of guide rails 222 to be coupled thereto such that the slider 223 can reciprocate in the X-axis direction, and the water jet nozzle 221 which reciprocates in the longitudinal direction (the Y-axis direction) of the slider 223 and sprays the water jet W. The water jet unit 22 may move the slider 223 in the X-axis direction and move the water jet nozzle 221 in the Y-axis direction to form a cut line or a cut groove in the battery. As a result, according to the present disclosure, the water jet nozzle 221 may move in the X-axis direction, the Y-axis direction, or the combined direction thereof and may cut and divide the battery in various preset patterns. Furthermore, according to the present disclosure, the water jet unit 22 may move upward and downward relative to a battery supported on the belt of the transfer conveyor.

The water jet nozzle 221 sprays a high-pressure water jet toward the battery supported on the belt of the transfer conveyor 21 and cuts the battery in a thickness direction thereof. The belt of the transfer conveyor 21 may have a drainage hole 21*a* formed therein so that the water jet ejected downward through the battery does not damage the belt of the transfer conveyor 21. That is, the drainage hole 21*a* may be formed in size and shape corresponding to the movable range of the water jet nozzle 221 or the cut portion of the battery. After cutting the battery, the water jet is induced to the inside of the transfer conveyor through the drainage hole 21*a* and then may be collected to a drain pipe (not shown). According to the present disclosure, a large amount of electrolytes discharged to the outside through a gap incised or opened in the cut portion of the battery formed by the water jet can be easily recovered through the drainage hole 21*a* due to the water jet which is sprayed downward.

According to the embodiment of the present disclosure, in the battery disposal apparatus 1, the battery cut and divided in the cutting part 20 is inserted into the discharging part 30. In the discharging part 30, the water tank 31 is filled with the discharging solution 32 so as to store and discharge multiple pieces divided by the cut line formed by water jet. The divided pieces of the battery are immersed in the discharging solution 32 and are discharged in water. According to the present disclosure, water (H2O) may be selectively used as the discharging solution 32.

As described above, in the battery disposal apparatus of the present disclosure, a large amount of electrolytes may be discharged through a gap incised or opened in the cut portion of the battery, and fast penetration of the discharging solution 32 into the battery may be ensured. In fact, in the battery disposal apparatus of the present disclosure, water can quickly penetrate into the divided pieces of the battery without using a discharging solution, such as an acidic solution, an alkaline solution, or brine, thereby improving a discharging rate, and an unnecessary process such as washing brine is excluded, thereby improving work efficiency.

Accordingly, according to the present disclosure, in the discharging part, the battery is completely discharged as the voltage of the battery decreases over a predetermined period of time. As is known to those skilled in the art, after the divided pieces of the battery are discharged, the divided pieces may be dismantled into the positive electrode plate, the negative electrode plate, and the separation membrane, and may be recycled. As described above, the discharging part 30 is made in the form of a water tank that can accommodate a discharging solution, and is configured as a simple structure that does not require the placement of a cutter or punching machine to fragmentize a waste battery underwater in the water tank, or a separate waterproof treatment for a cutter or punching machine as in the conventional technology.

Figure 4:
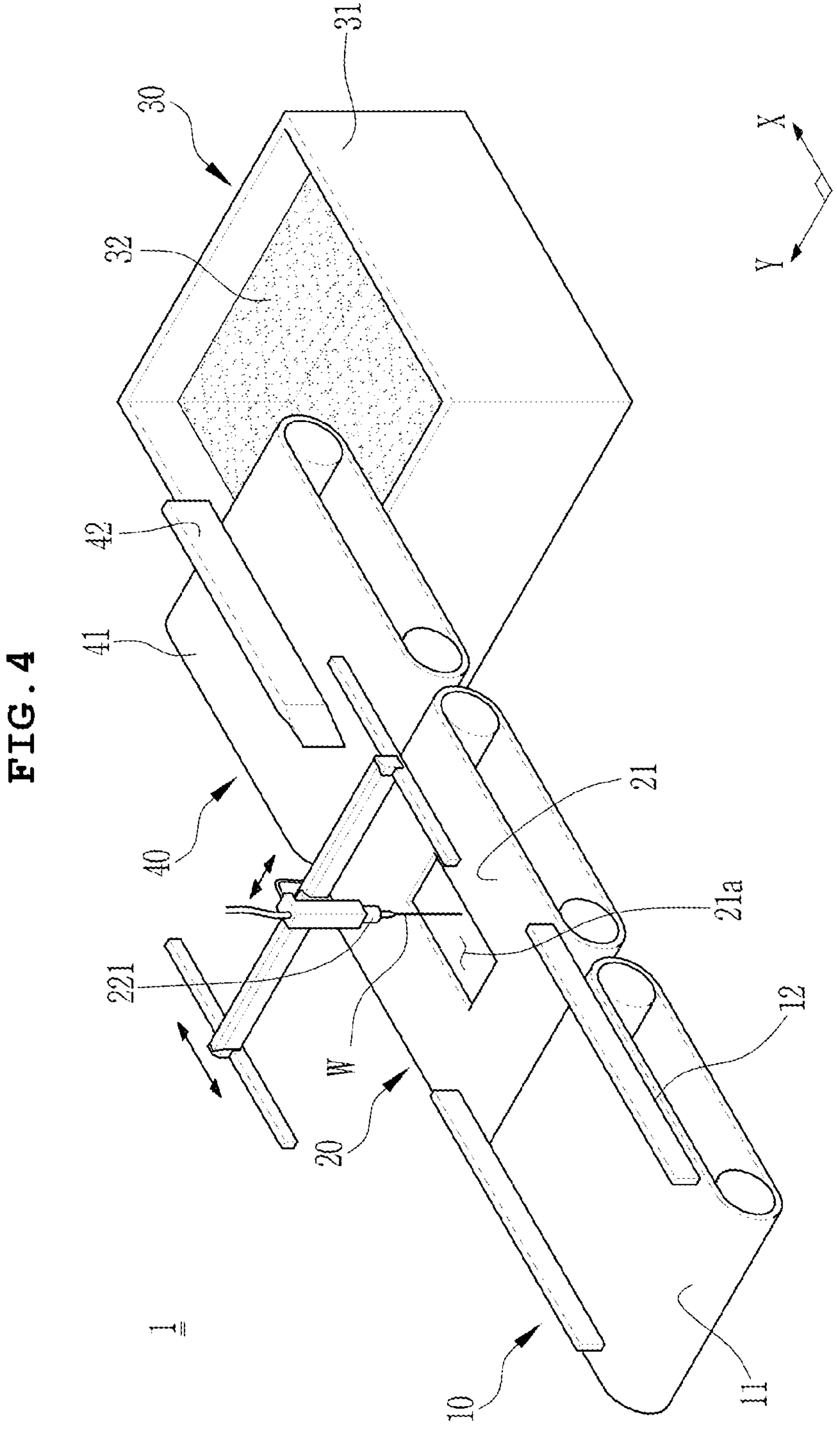
FIG. 4 is a perspective view schematically illustrating the battery disposal apparatus according to another embodiment of the present disclosure.

FIG. 4 is a perspective view schematically illustrating the battery disposal apparatus according to another embodiment of the present disclosure. The battery disposal apparatus illustrated in FIG. 4 is a modified example of the battery disposal apparatus according to the present disclosure illustrated in FIG. 3, and is configured to have a very similar structure to the disposal apparatus of FIG. 3 except for the arrangement of a separating part. Accordingly, in order to facilitate a clear understanding of the present disclosure, descriptions of similar or identical configurations will be excluded here.

According to the another embodiment of the present disclosure, in the battery disposal apparatus, the aligning part 10, the cutting part 20, the separating part 40, and the discharging part 30 are arranged in order. That is, in the battery disposal apparatus according to the another embodiment of the present disclosure, the separating part 40 may be disposed between the cutting part 20 and the discharging part 30.

As illustrated, in the battery disposal apparatus, the separating part 40 is disposed at the downstream side of the cutting part 20 and is configured to guide multiple divided pieces to the downstream side of the separating part 40 while excluding unnecessary contact between the multiple divided pieces. To this end, the separating part 40 includes a removing conveyor 41 which transfers a battery introduced (cut and divided) from the cutting part 20 to a subsequent process, and a blade 42 disposed on the belt of the removing conveyor 41 to separate the cut and divided battery into individual divided pieces while the cut and divided battery is transferred in the moving direction. Preferably, the blade may be made of an insulating material such as silicon or ceramic.

In the process of dismantling the battery, contact between the opposite cut surfaces of the cut portion formed along the cut line of the battery causes an internal short circuit, which often causes a fire. In order to solve this problem, the blade 42 extends on the belt of the removing conveyor 41 in the moving direction thereof so that the blade 42 widens the cut line formed on the battery to completely separate the battery into individual divided pieces so as to prevent unnecessary contact in the cut portion. Furthermore, the blade 42 may extend to the discharging part 30 from the rear of the transfer conveyor 21.

Figure 7A:
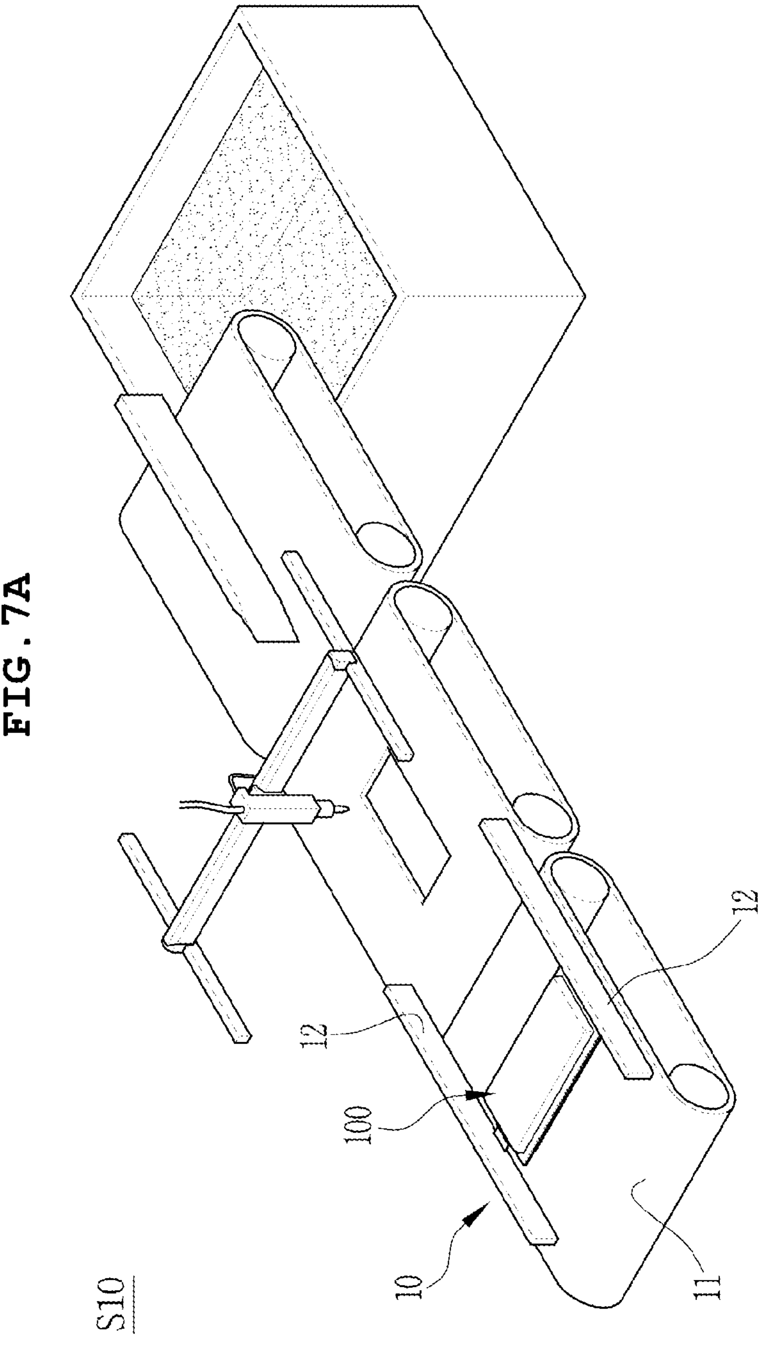
FIGS. 7A to 7D are schematic views illustrating a battery disposal method according to the present disclosure step by step.
Figure 7B:
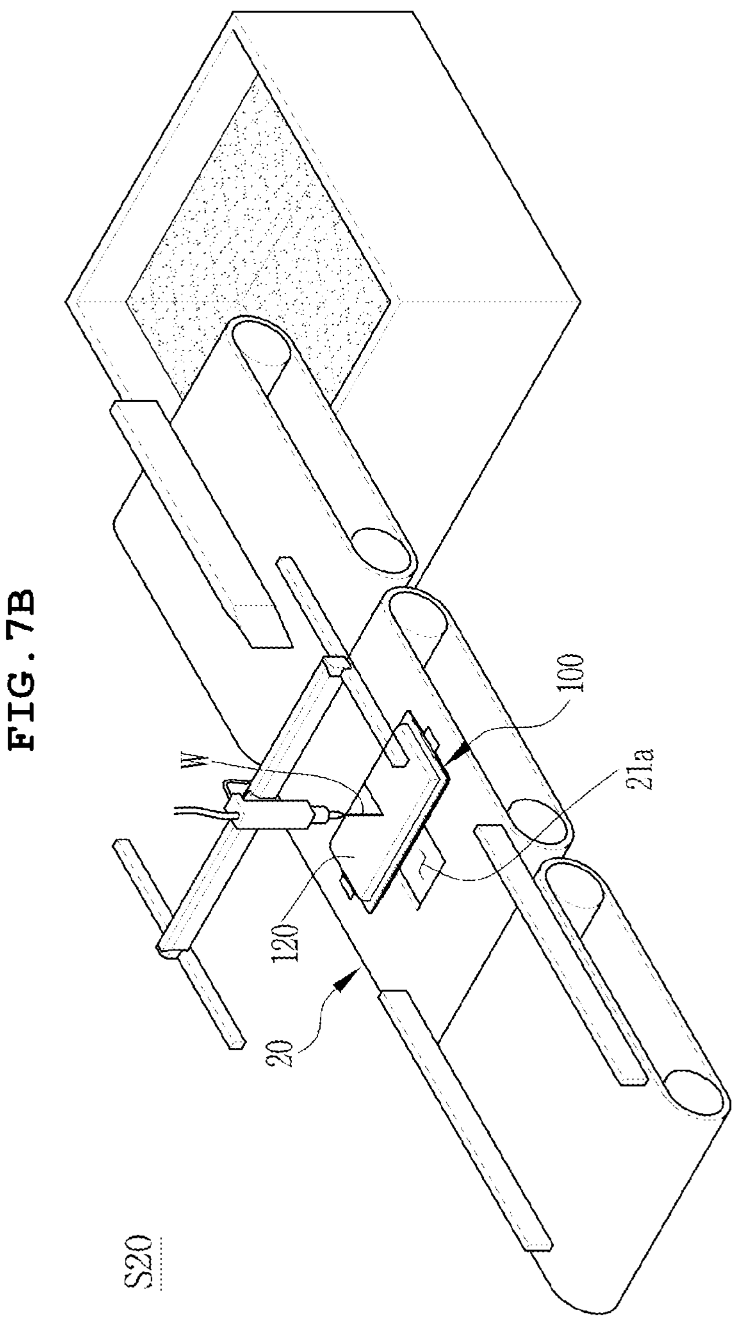
Figure 7C:
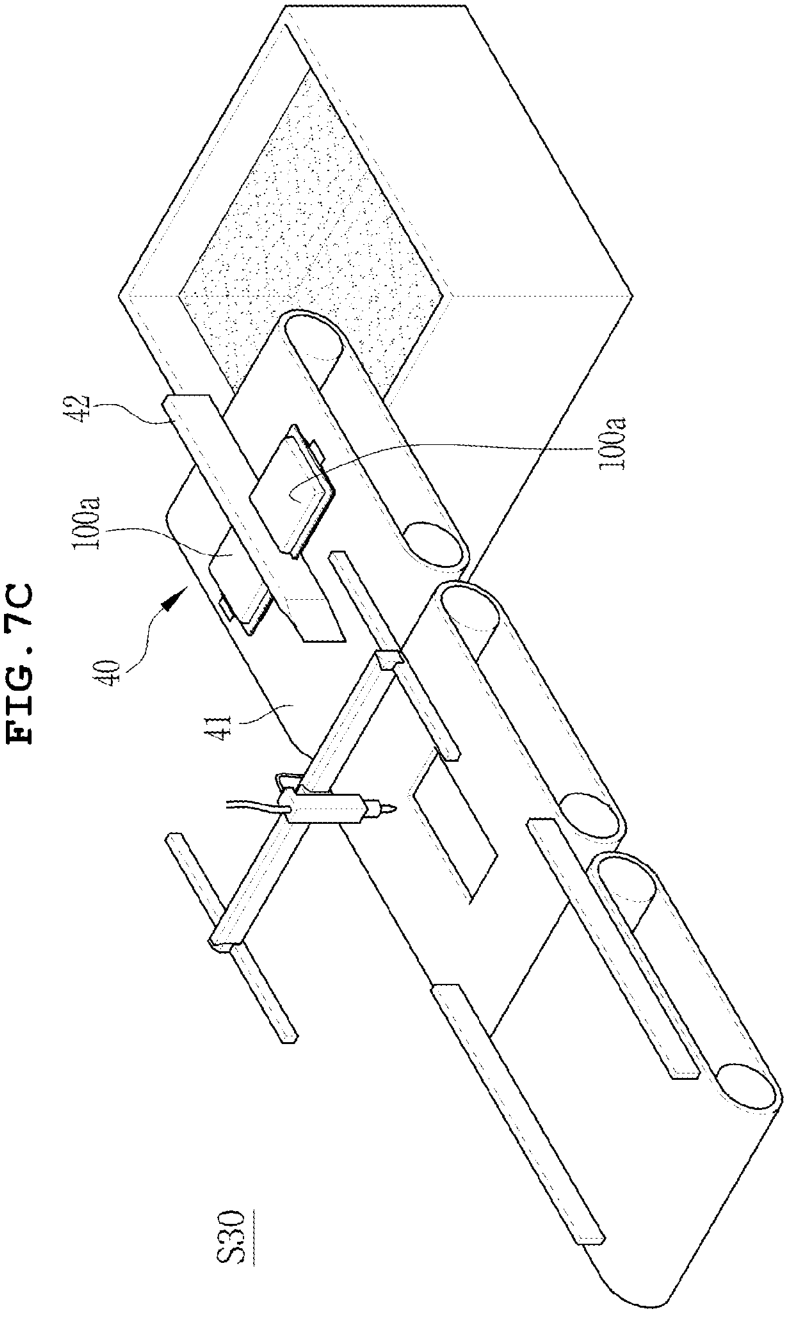
Figure 7D:
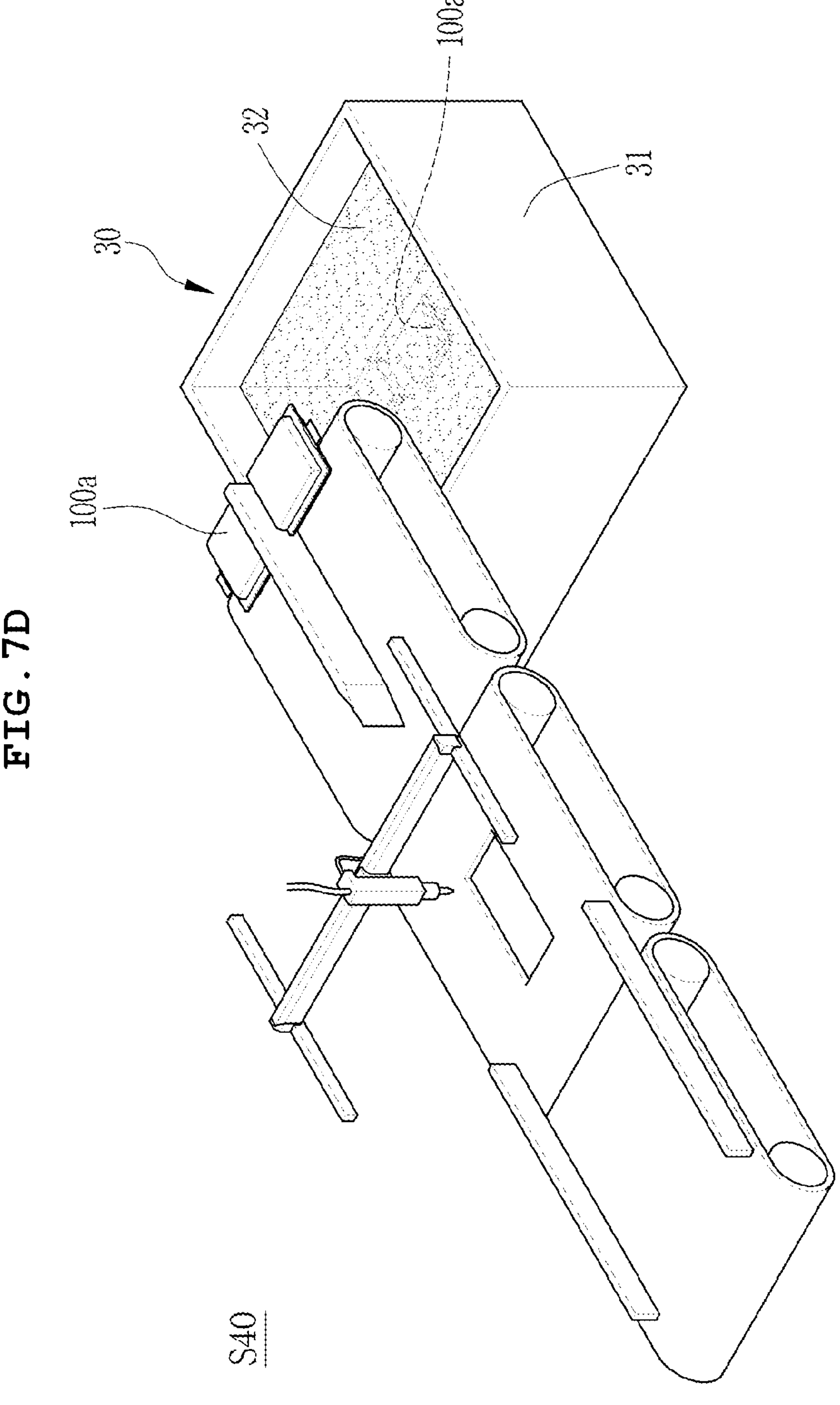

Furthermore, the blade 42 may be disposed within the belt of the removing conveyor 41 in the moving direction thereof, and may be aligned to correspond to the cut portion of the battery so that the blade can be inserted into a portion between the opposite cut surfaces of the cut portion of the battery, specifically, into the cut groove (see FIG. 7C). That is, the blade may be disposed on the removing conveyor and on the same line as the cut portion of the battery. Of course, the blade 42 is positionally fixed on the upper side of the removing conveyor 41 so that the blade 42 does not rotate in conjunction with the removing conveyor 41.

Figure 5:
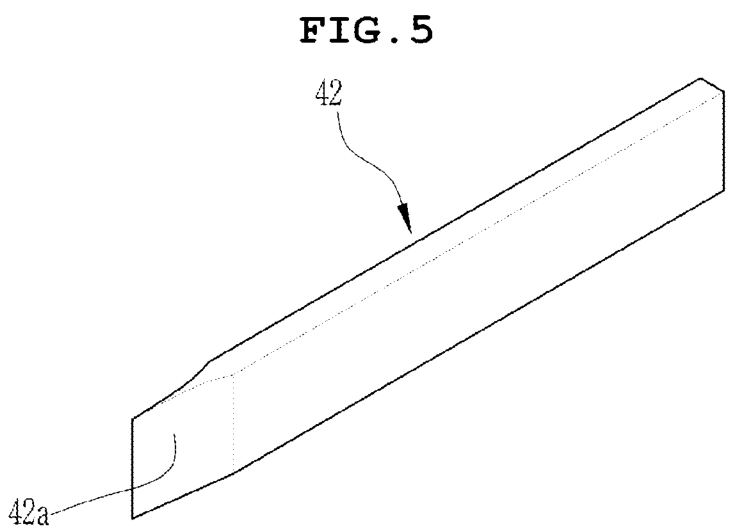
FIG. 5 is an enlarged view of a blade illustrated in FIG. 4.

As illustrated in FIG. 5, a front end part of the blade 42 is formed in a wedge shape 42*a* having thickness gradually increasing toward a rear end part thereof. This is intended that the front end part of the blade 42 can be easily inserted into a narrow cut portion (or into the cut line) and individual divided pieces can be separated from each other while being transferred in the moving direction of the removing conveyor.

For reference, each of the introducing conveyor 11, the transfer conveyor 21, the removing conveyor 41 described in the present disclosure may be a belt conveyor in which a battery is placed on a caterpillar belt which is rotated continuously by an electric means and is transferred to a subsequent process, but is not limited thereto, and may be any transport means capable of transporting a battery to a subsequent process.

Figure 6:
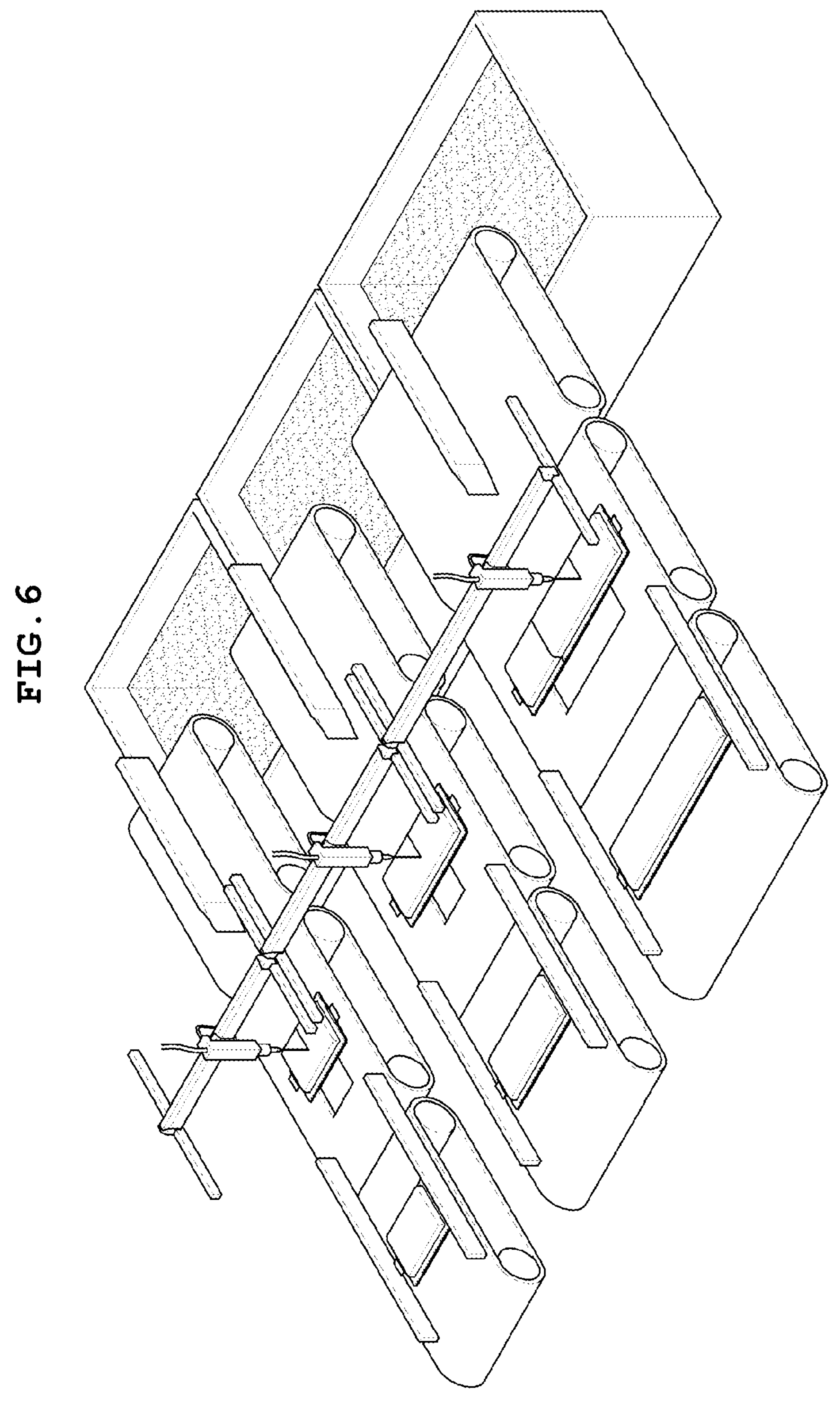
FIG. 6 is a view schematically illustrating an example of the use of the battery disposal apparatus according to the present disclosure.

FIG. 6 is a view illustrating an example in which the battery disposal apparatus according to the present disclosure is extended and installed.

According to the present disclosure, one or more battery disposal apparatuses may be used to be disposed parallel to each other. This enables batteries of various sizes to be sorted and disposed of and a large amount of batteries to be simultaneously processed, thereby improving efficiency of dismantling.

Hereinafter, a battery disposal method using a water jet will be described with reference to FIGS. 7A to 7D. For reference, the battery disposal method described in the present disclosure will be described based on the battery disposal apparatus illustrated in FIG. 4.

First of all, the battery disposal method of the present disclosure includes aligning the battery 100 on the belt of the introducing conveyor 11 of the aligning part 10 at S10. The battery 100 may be located between the at least two guide bars 12 disposed to be spaced apart from each other by facing each other on the introducing conveyor 11 and may be guided toward a subsequent process in an aligned state by the rotation of the introducing conveyor 11.

As illustrated in FIG. 1, in the battery 100, the electrode lead electrically connected with the electrode assembly is removed to the outside of the pouch. Selectively, the battery disposal method may further include removing of the electrode lead prior to the aligning of the battery at S10 for preventing contact between batteries and efficient recovery of the electrode lead.

In addition, the battery disposal method of the present disclosure includes cutting and dividing of the battery 100 at S20.

In the cutting of the battery at S20, the battery 100 may be incised or cut by means of the water jet W. According to the present disclosure, the water jet nozzle may incise or cut the battery in various patterns which can be preset by changing a position thereof while spraying the water jet at high pressure onto the battery. For example, a connection portion between the sealing part and the receiving part of the pouch 120 may be incised (see FIG. 2A), at least one cut groove may be drilled in the receiving part of the pouch 120 (see FIG. 2B), at least one circular divided piece may be formed in the receiving part of the pouch 120 (see 2C), or the pouch 120 may be cut and divided into multiple divided pieces (see 2D).

Particularly, according to the present disclosure, as described above, the water jet finely cuts a battery and forms an opening section between the opposite cut surfaces of divided pieces of the battery, thereby preventing an internal short circuit of the battery and preventing deterioration in the cut portion. Together with the water jet W which cuts the battery in a thickness direction thereof and is sprayed downward, an electrolyte discharged to the outside through the cut line of the battery may be guided downward across the drainage hole 21*a* formed in the belt of the transfer conveyor 21.

According to the present disclosure, as described above, by activating the water jet unit, the water jet nozzle may reciprocate on a two-axis plane on the battery and may provide a cut line or a cut groove formed in various patterns on the battery. In this case, in the cutting part 20, to form the cut line or cut groove of various patterns in the battery 100 supported on the belt of the transfer conveyor, the transfer conveyor may repeat moving in the moving direction thereof and stopping.

Preferably, to decrease the problem of fire and explosion due to unnecessary contact between the divided pieces 100*a* until the battery is cut and divided and is introduced into the discharging solution filled in the discharging part 30, direct contact between the divided pieces is required to be prevented. Accordingly, the battery disposal method of the present disclosure may include the separating of batteries cut and divided at S30 between the cutting of the battery at S20 and the discharging of the battery at S40.

The separating at S30 helps the introduction of the individual divided pieces 100*a* to a subsequent process by clearly separating the individual divided pieces 100*a* from each other to maintain separate states while the multiple divided pieces are transferred to the discharging part 30 after the battery is cut and divided into the multiple divided pieces in the cutting part 20. The individual divided pieces may be separated from each other by means of the blade 42 arranged in the moving direction on the belt of the removing conveyor 41 of the separating part 40.

After the cutting at S20, more specifically, after the separating at S30, the battery disposal method of the present disclosure includes discharging the individual divided pieces of the battery by immersing the individual divided pieces in the discharging solution for a predetermined period of time at S40. Accordingly, the remaining electrical energy of the battery is completely discharged, and thus the battery can be safely disposed of.

The present disclosure has been described in detail through the specific embodiments. The embodiments are intended to describe the present disclosure in detail, and the present disclosure is not limited thereto. It is clear that the embodiments may be modified or improved within the technical spirit of the present disclosure by those skilled in the art.

All simple modifications or changes of the present disclosure fall within the scope of the present disclosure, and the specific protection scope of the present disclosure will be clarified by the appended claims.

What is claimed is:

1. A battery disposal apparatus comprising:

a cutting part configured to cut and divide a battery;

a discharging part configured to immerse and discharge divided pieces of the battery cut and divided in the cutting part in a discharging solution; and a separating part disposed between the cutting part and the discharging part, and the separating part including a removing conveyor configured to transfer the divided pieces of the battery to the discharging part, and a blade extending in a moving direction of the removing conveyor, wherein the cutting part is configured to incise or cut the battery in a preset pattern by water jet.

2. The battery disposal apparatus of claim 1, wherein the cutting part comprises:

a transfer conveyor which has a drainage hole formed in an inner portion of a belt of the transfer conveyor supporting the battery and transfers the battery; and a water jet unit located above the transfer conveyor configured to spray a water jet.

3. The battery disposal apparatus of claim 2, wherein the water jet unit reciprocates a water jet nozzle, which sprays the water jet at high pressure on a two-axis (X and Y axes) plane.

4. The battery disposal apparatus of claim 3, wherein the drainage hole is formed to have a size and shape corresponding to a movable range of the water jet nozzle or a cut portion of the battery.

5. The battery disposal apparatus of claim 1, further comprising:

an aligning part disposed at an upstream side of the cutting part, wherein the aligning part comprises: an introducing conveyor configured to seat and align the battery and transfer the battery to a downstream side; and at least two guide bars disposed to be spaced apart from each other by facing each other along a moving direction of the introducing conveyor.

6. The battery disposal apparatus of claim 5, wherein the guide bar extends from the introducing conveyor to a front of a transfer conveyor of the cutting part.

7. The battery disposal apparatus of claim 1, wherein the blade comprises an insulating material and is disposed on the removing conveyor so that the blade corresponds to a cut portion of the battery.

8. The battery disposal apparatus of claim 1, wherein a front end part of the blade is formed in a wedge shape having thickness gradually increasing toward a rear end part of the blade.

9. The battery disposal apparatus of claim 1, wherein the discharging solution comprises water (H2O).

10. The battery disposal apparatus of claim 1, wherein a rear end part of the blade extends to the discharging part.

* * * * *